United States Patent [19]

Rigg

[11] 4,253,630

[45] Mar. 3, 1981

[54] PERSONALLY PORTABLE HELMET REST

[76] Inventor: Dale L. Rigg, 12300 Sherman Way, Apt. Cl, North Hollywood, Calif. 91605

[21] Appl. No.: 926,654

[22] Filed: Jul. 21, 1978

[51] Int. Cl.$^3$ .............................................. F16M 13/00
[52] U.S. Cl. ..................................................... 248/346
[58] Field of Search ..................... 248/146, 346, 346.1, 248/359, 632, 633, 678

[56] References Cited

U.S. PATENT DOCUMENTS

| | | | |
|---|---|---|---|
| 511,617 | 12/1893 | Howard | 248/359.1 |
| 1,859,492 | 5/1930 | Balestra | 248/346.1 |
| 1,859,928 | 5/1932 | MacCollum | 248/632 X |
| 2,313,823 | 3/1943 | Harrigan | 248/346 |
| 2,683,579 | 7/1954 | Wallace | 248/346 X |
| 2,914,275 | 11/1959 | Mitchell | 248/633 |

*Primary Examiner*—William H. Schultz
*Attorney, Agent, or Firm*—Finkel, Robert L.

[57] ABSTRACT

A pocket-size rest for use with motorcycle helmets and the like is a flexible annulus of trapezoidal cross-section, with slits diametrically located in the inner and outer bottom edges of the trapezoid to promote deformation of the rest to conform to irregularly shaped support surfaces. Treads in the base of the rest are advantageously made to run in one direction in certain regions and in a perpendicular direction in other regions, coacting with the slits to promote good stability particularly on support surfaces which have compound curves. The rest is dimensioned to support a helmet well out of contact with planar support surfaces.

3 Claims, 4 Drawing Figures

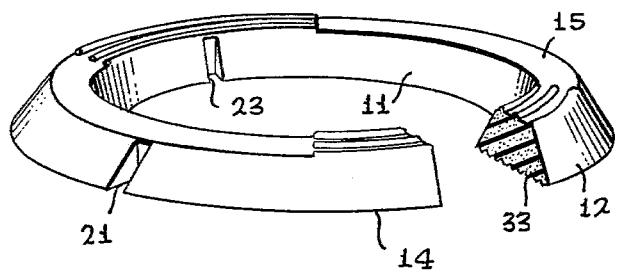
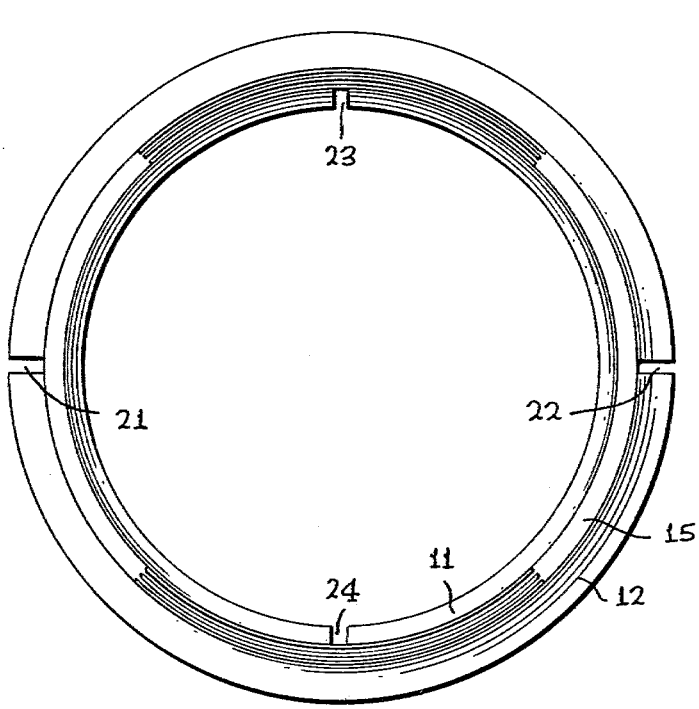
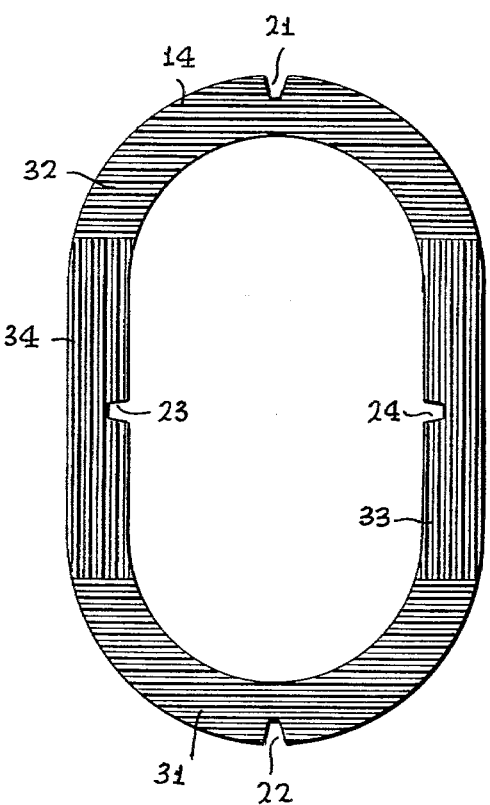
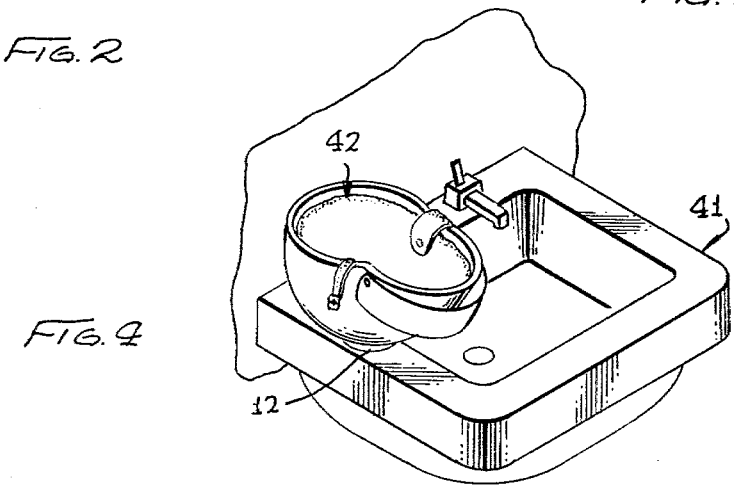

PERSONALLY PORTABLE HELMET REST

BACKGROUND OF THE INVENTION

My invention is in the field of personal accessories for individuals who use helmets, and particularly motorcycle helmets. More specifically, my invention is in the field of articles to retain and support a motorcycle helmet when the helmet is not in use.

Most motorcycles have inadequate securable storage space for the rider's helmet. Lockable saddlebags or caddies for helmets are expensive and bulky, and for many riders spoil the appearance of the machine. As a result many or most motorcyclists carry their helmets with them when they leave their motorcycles. This creates a considerable inconvenience in many circumstances because there is often no convenient and acceptable place to put the helmet down.

For example, in a public washroom there are almost never shelves adequately large to support a helmet, and the floor is very often abrasive, dirty, or covered with water of questionable cleanliness. Placing the helmet upside-down on such a floor can result in having the helmet roll around—especially if it is accidentally kicked—and having its exterior finish scratched or abraded. Placing the helmet right-side-up on such a floor results in portions of the helmet first resting on the floor and then later touching the motorcyclist's skin or clothing. Obviously, this is both distasteful and a potential health hazard. Quite often the only clean, dry place available to set a helmet conveniently is sloped and/or very narrow. On even a slight incline, however, the smooth, rounded surface of a helmet makes balancing a frustrating if not impossible feat.

Even in private homes it can be hard to find a ready-at-hand place to put a motorcylce helmet: homeowners object to helmets being placed on expensively finished furniture tops, for fear of marring the furniture; and placing a helmet on the floor can become an invitation to children to play with the helmet and cause damage or injury.

Various forms of loops and hang-straps have been proposed as a solution to these problems. Some are affixed permanently to the helmet, while others are detachable. The permanent loops and straps, if adequately large to accomplish their purpose, create an extreme safety hazard when the user wears the helmet while operating a motorcycle. Smaller loops and straps are awkward to use, and detachable ones are inconvenient to carry and to use. Further, it is frequently difficult to find a convenient place to hang an object as large and cumbersome as a helmet, or a hook strong enough to support it.

My invention is directed to overcoming these difficulties by providing a lightweight, inexpensive, compact, portable article for use by motorcyclists or other helmet-wearers in putting helmets down in areas where there is no otherwise suitable or adequate place for them. It is particularly directed to providing a helmet rest which is readily available for instant use in practically any location.

SUMMARY OF THE INVENTION

My invention is a flexible annulus of trapezoidal cross-section, for maximum stability. Slits are cut in the bottom edges of the trapezoid—two slits diametrically opposite one another in the outer bottom edge of the article, and two other slits diametrically opposite one another in the inner edge of the article, and aligned at right angles to the first two slits. These four (or more, if desired) slits permit the article to deform in compliance with irregular support surfaces. The resulting pocket-size rest supports a helmet upside-down on a surface as narrow as two inches across—or even smaller, depending upon the three-dimensional shape of the support surface.

The rest may be carried in the user's pocket, or with most motorcycles the rest can be placed over the end of the handlebars, just past the grips. In either case it is essentially instantly available.

Treads in the base of the rest are advantageously made to run perpendicular to the diameter between the two outer-edge slits, in the areas near those two slits; and parallel to that diameter in the intervening areas. The treads are advantageously made in such a way that they become substantially rectilinear when the rest is deformed by elongation along the aforesaid diameter; thus the treads are curved when the rest is not deformed. I have found this configuration to be particularly helpful in preventing the rest from sliding on inclined or compound-radius support surfaces.

It is also possible to provide treads in the top of the rest, but I find it preferable simply to cast the rest without treads but using a soft plastic material such as urethane; helmets actually have more static friction against a flat-topped urethane rest than against one with treads.

The helmet rest is dimensioned so that when on a planar support surface it supports the helmet well out of contact with the support surface. Even on a moderately convex surface the rest keeps the helmet out of contact with the surface.

All of the foregoing description will be more-readily understood from the following detailed discussion of a preferred embodiment of my invention, and from reference to the appended drawings, of which:

BRIEF DESCRIPTION OF THE DRAWINGS

FIG. 1 is a perspective drawing, partly cut away to show a cross-section, of a helmet rest made in accordance with my invention.

FIG. 2 is a top view of the rest of FIG. 1.

FIG. 3 is a bottom view of the rest of FIGS. 1 and 2 when deformed in a manner described hereunder.

FIG. 4 is a perspective view of the same helmet rest, in use.

DETAILED DESCRIPTION OF THE INVENTION

As seen in FIG. 1 the helmet rest consists of an annulus with inclined inner surface 11 and outer surface 12, and a flat base 14 and top 15—producing generally trapezoidal cross-section 13. I prefer to make cross-section 13 substantially as a truncated isosceles triangle; that is, the inner and outer surfaces 11 and 12 are inclined at the same angle.

As better seen in FIG. 2, two notches or slits 21 and 22 are cast or cut in the outer surface 12 of the annulus. These notches are generally diametrical, and each is a substantially vertical cut extending about halfway through the cross-section of the rest. These slits permit the rest to be readily deformed in the manner illustrated in FIG. 3, though a slight additional ease of deformation results from providing two additional slits 23 and 24, also mutually diametrical but along a diameter which is perpendicular to the diameter through slits 21 and 22.

The additional slits 23 and 24 are in the inner surface 11 of the annulus, and need not extend more than about a third of the distance across the cross-section.

These four slits give the rest the property of conforming readily to relatively small, compound surfaces without losing its ability to support a helmet. Of course greater numbers of slits could be provided, and in different relative positions, without departing from the scope of my invention; however, the slits here described are adequate to provide the advantages described.

It is helpful to have treads or antiskid texturing along the base 14 of the annulus. On an inclined planar support surface, the angular orientation of the annulus is not in general known in advance, so the treads should preferably run in two orthogonal directions as shown in FIG. 3. On a compound-radius support surface, I have discovered that the best traction results from orienting treads 31 and 32, in the areas near slits 21 and 22 respectively, perpendicular to the diameter separating slits 21 and 22; and from orienting treads 33 and 34, in the intervening areas near slits 23 and 24 respectively, parallel to the same diameter. I also believe that superior traction results from configuring the tread pattern so that all the treads 31, 32, 33 and 34 are roughly rectilinear when the annulus is deformed as shown in FIG. 3, and of course curved when the annulus is, as in FIG. 2, undeformed.

The helmet rest of my invention can be used to hold a helmet on a finely finished surface, but in such a fashion that only the soft material of the rest, not the helmet, touches the surfaces. The rest can also be used as shown in FIG. 4 to stably position a helmet 42 upside-down on the edge of a washbasin 41 or the like, through the intermediary of the helmet rest, with outer surface 12 showing in FIG. 4.

All of the advantageous uses of my invention are in my opinion best realized by dimensioning the annulus with a height of approximately 0.3 inch, base 14 inside diameter of approximately 2.25 inches and outside diameter of approximately 2.87 inches, and top-surface 15 annular width of approximately 0.062 inch. These dimensions are suited for use with helmets of all standard sizes, from a size 6 for small children to a size 8 or even larger for very big adults. If desired, the sharp angles at the inner and/or outer lower corners of the cross-section can be removed, as for example by a small vertical bevel.

It is to be understood that all of the foregoing description is by way of example only, and not meant to limit the scope of my invention—which is to be established by reference to the appended claims.

What is claimed is:

1. A portable stabilizing rest for retaining and supporting on a surface a rigid safety helmet or the like having a convex outer shell, said rest comprising:
    a flexible, resilient, normally annular body of generally trapezoidal cross-section, having a top, a bottom, and upwardly converging outer and inner walls; and
    a first pair of diametrically opposed radial slits formed in said outer wall, extending from the top to the bottom of said body, whereby said body is readily deformed by the weight of such helmet for conforming contact between the outer shell of the helmet and the top of said body, and between the bottom of said body and the supporting surface.

2. The helmet rest of claim 1, comprising:
    a second pair of diametrically opposed radial slits formed in said inner wall between said first pair of slits, extending from the top to the bottom of said body.

3. In combination with a rigid safety helmet or the like having a convex outer shell, a portable stabilizing rest for retaining and supporting said helmet on a surface, comprising:
    a flexible, resilient, normally annular body of generally trapezoidal cross-section, having a top, a bottom, and upwardly converging outer and inner walls; and
    opposed pairs of orthogonal treads diametrically opposed regions in said bottom.

* * * * *